Jan. 29, 1952 L. B. OBENCHAIN 2,583,663
AWNING FOR TRAILERS
Original Filed March 5, 1948
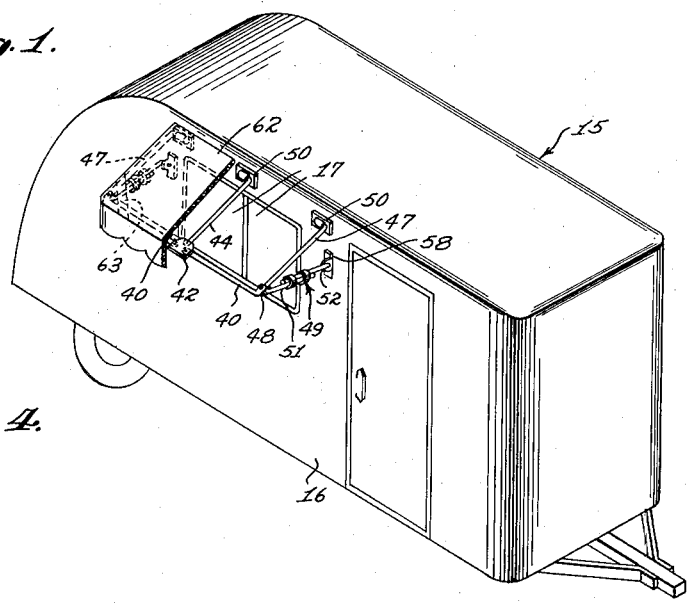
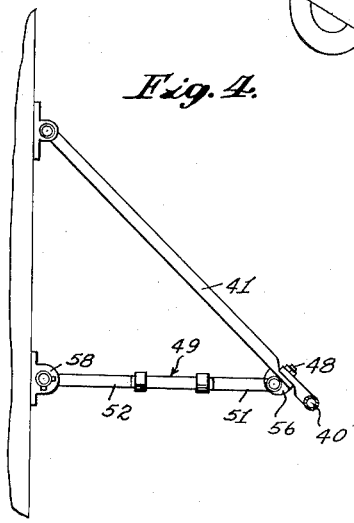
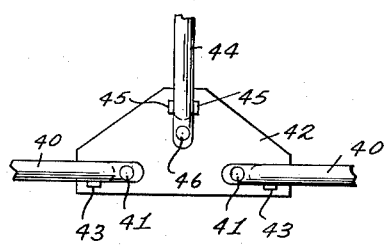
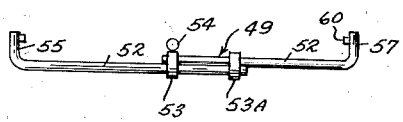
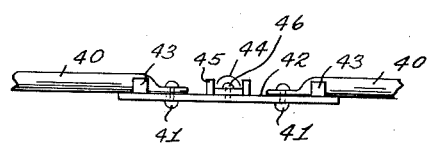
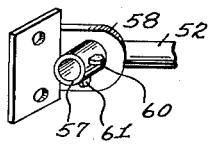
INVENTOR.
LEO B. OBENCHAIN
BY
McMorrow, Berman & Davidson
ATTORNEYS Patented Jan. 29, 1952

2,583,663

UNITED STATES PATENT OFFICE 2,583,663

AWNING FOR TRAILERS

Leo B. Obenchain, Branford, Conn.

Original application March 5, 1948, Serial No. 13,281. Divided and this application April 17, 1951, Serial No. 221,373

4 Claims. (Cl. 160—76)

This application is a division of my application Serial No. 13,281, filed March 5, 1948, Patent No. 2,556,210 dated June 12, 1951, and has to do with an invention relating to Awning for Trailers.

An object of the present invention is to provide an awning having a foldable metal framework formed of tubes, the framework including adjustable brace bars hingedly connected between an exterior wall of a trailer and points on the legs of a U-shaped member where said legs are pivotally attached to said member, the legs and braces being foldable onto the bight portion of the U-shaped member to form a compact bundle for storage.

Another object of the invention is the provision of an awning for a trailer in which a foldable framework is employed for supporting the usual fabricated materials for protecting a pair of windows against rain and sunshine, said framework being in the form of a U-shaped member having a bight portion composed of two rods hingedly connected at the inner ends thereof to a plate, the legs of the U-shaped member being also hinged adjacent the outer ends of the bight portion, an intermediate supporting arm being connected between the plate and a wall of the trailer, the legs being foldable onto the adjacent rods forming the bight portion with said rods being foldable onto the supporting arm.

The invention consists in the novel construction, arrangement and combination of parts hereinafter more particularly described and claimed.

In the drawing:

Figure 1 is a view in perspective showing an awning of the present invention applied to a window of a trailer.

Figure 2 is an enlarged bottom plan view of a connecting plate for two sections of a bight portion of the U-shaped frame shown in Figure 1.

Figure 3 is an end view of the plate and attached portions of the frame shown in Figure 2.

Figure 4 is an enlarged end view in elevation of the framework applied to a wall of the trailer.

Figure 5 is an enlarged side view of an adjustable brace bar of the frame shown detached therefrom.

Figure 6 is an enlarged view in perspective of a bearing on a wall bracket and an end of a brace for the U-shaped frame shown in operative relation.

Referring to the drawings, the numeral 15 designates a trailer having a side wall 16 provided with a pair of windows 17. In this form, a U-shaped member manufactured from metal tubing has a bight portion which includes sections 40 of tubing having the inner ends pivoted at 41 on a plate 42. Lugs 43 rising from the plate prevent or restrict outward swinging movement of the sections 40. A reinforcing arm 44 extends inwardly from the plate 42 and is held against rocking movement by lugs 45. The arm is secured at 46 to said plate.

Legs 47 are pivoted on pins 48 carried by inturned portions at the outer ends of the sections 40 of the bight portion of the U-shaped frame. The free ends of the legs 47 and the arm 44 are bent laterally and received by sockets 50 secured to the exterior wall 16 of the trailer above the windows 17.

Brace bars 49 retain the U-shaped frame in position. Each bar consists of a pair of tubular rods 51 and 52 having the inner ends slidably connected together by bands 53 and 53a. A set screw 54 on the band 53 clamps the rods together in an adjusted position. A bent end 55 on each rod 51 is received by an eye 56 formed integrally with the lower end of the pin 48. The free end of each rod 52 is bent at 57 and received by a bearing 58 secured to the wall 16 below the bent free ends of the legs 47. As shown more particularly in Figure 6, the bent end 57 of each of the rods 52 has a lug 60 which will prevent escape of said end from the bearing when the rods 52 are substantially in a horizontal plane. However when the rods are lowered, the lugs 60 will pass through a slot 61 in each bearing to release said ends.

A fabric covering 62 is draped over the U-shaped frame and has corner pockets 63 at the under face to receive the rectangular corners of the frame. Tapes are also employed for attaching the upper portions of the covering to the inner ends of the legs 47 and the arm 44.

The brace bars 49 may be adjusted to raise or lower the outer end of the awning. For this purpose it is only necessary to loosen the screws 54 whence the rods 51 and 52 may be moved toward or away from each other. After the adjustment has been made, the set screws are tightened.

The awning may be readily removed and stored in a compact mass when desired. The bent ends 55 of the rods 51 are withdrawn from the eyes 56. On the other hand, the ends 55 may be swaged over for retaining said ends in the eyes whence the braced rods will be folded against the legs 47 and said legs will be folded against the sections 40. Said sections together with the folded legs and brace bars are moved inwardly onto the arm 44 to provide a compact unit for storage.

The inner edge of the fabric 62 when the fabric is secured in place on the frame, is in snug contact with the side wall 16 of the trailer. Said fabric is easily removed from the supporting frame. The tapes are untied and the fabric is slipped off from the frame. When the brace bars are applied to the frame, the fabric is pulled downwardly to release the pockets 23a from the inturned ends on the sections 40.

The particular construction provides an awning especially for trailers so that the windows may be opened or closed without requiring the adjustment of the awning. The awning is independent of the window so that the window, when closed, will transmit an abundance of light at all times regardless of the position of the window. The usual custom is to apply the awning to the window so that when the window is closed, light will be shut off.

While I have stated that the rigid elements of the frame of the awning are formed of tubing, it will be appreciated that said elements may be formed of round rods or pipes. The tubing or pipes provide greater strength in smaller diameter and less weight.

Ties or tapes (not shown) are secured to the under face of the canvas 62 adjacent the upper end of the bar 44. Tapes are also employed at either side of the plate 42 for securing the canvas in position.

Having thus described the invention, what is new and desired to be secured by Letters Patent is:

1. An awning frame for attachment to a side wall of a trailer including a foldable frame comprising a U-shaped member having a bight portion and a pair of legs, the ends of the bight portion being inturned, a pin pivotally connecting an end of each leg with an inturned end on the bight portion, each pin carrying an eye, a brace bar at each end of the awning having an inturned end received by the eye, spaced bearings fixed to the side wall adjacent a window, the other ends of the brace bars being inturned and received by the adjacently disposed bearing, and means pivotally connecting the other ends of the legs to the side wall of the trailer.

2. An awning frame for attachment to a side wall of a trailer including a foldable frame comprising a U-shaped member having a bight portion and a pair of legs, the ends of the bight portion being inturned, a pin pivotally connecting an end of each leg with an inturned end on the bight portion, means pivotally connecting the other ends of the legs with the side wall of the trailer above windows in said wall, a brace bar adjacent each leg and formed of a pair of rods, means adjustably connecting the adjacent ends of the rods together, means pivotally connecting a free end of one rod to the pivoted end of an associated leg, and means pivotally connecting the free end of the other rod with the side wall.

3. An awning frame for attachment to a side wall of a trailer including a foldable frame comprising a U-shaped member having a bight portion and a pair of legs, the ends of the bight portion being inturned, a pin pivotally connecting an end of each leg with an inturned end on the bight portion, each pin carrying an eye, a brace bar at each end of the awning having an inturned end received by the eye, spaced bearings fixed to the side wall adjacent a window, the other ends of the brace bars being inturned and received by the adjacently disposed bearing, means on the last mentioned inturned ends of the brace bars for preventing the escape of said ends from the bearings, and means pivotally connecting the other ends of the legs to the side wall of the trailer.

4. An awning frame for attachment to a side wall of a trailer including a foldable frame comprising a U-shaped member having a bight portion formed of two sections, a plate, the inner ends of the sections being pivoted on the opposite ends of the plate, a reinforcing arm having one end secured to the plate, means pivotally connecting the other end of said arm on the side wall, the legs of the U-shaped member having pivotal connections with the outer ends of the sections, and a brace bar in juxtaposition with each leg, one end of each bar being hinged on said pivotal connections, the other end of each bar having hinged connections with the side wall, each brace bar being foldable onto the associated leg and onto an adjacent section of the bight portion, each section together with the associated leg and brace bar being foldable against the reinforcing arm.

LEO B. OBENCHAIN.

REFERENCES CITED

The following references are of record in the file of this patent:

UNITED STATES PATENTS

| Number | Name | Date |
| --- | --- | --- |
| 1,813,525 | Astrup | July 7, 1931 |
| 2,201,887 | De Bord | May 21, 1940 |
| 2,556,210 | Obenchain | June 12, 1951 |